United States Patent [19]

Takei et al.

[11] Patent Number: 4,734,785
[45] Date of Patent: Mar. 29, 1988

[54] IMAGE PROCESSING APPARATUS HAVING AN AUTOMATIC SAMPLING MODIFICATION FUNCTION

[75] Inventors: Masahiro Takei, Yokohama; Makoto Takayama, Kawasaki, both of Japan

[73] Assignee: Canon Kabushiki Kaisha, Tokyo, Japan

[21] Appl. No.: 705,536

[22] Filed: Feb. 26, 1985

[30] Foreign Application Priority Data

Mar. 2, 1984 [JP]  Japan .................................. 59-38874

[51] Int. Cl.$^4$ ..................... H04N 1/387; H04N 1/393; H04N 1/46
[52] U.S. Cl. .................................... 358/285; 358/287; 358/77
[58] Field of Search .................... 358/77, 75, 287, 285, 358/288, 138; 364/577

[56] References Cited

U.S. PATENT DOCUMENTS

| | | | |
|---|---|---|---|
| 4,417,805 | 11/1983 | Kishi | 358/287 |
| 4,558,374 | 12/1985 | Kurata et al. | 358/287 |
| 4,568,973 | 2/1986 | Ishida | 358/287 |
| 4,587,621 | 5/1986 | DuVall | 358/287 |
| 4,658,300 | 4/1987 | Kawamura et al. | 358/280 |

FOREIGN PATENT DOCUMENTS 2139846  5/1983  United Kingdom ................ 358/287

*Primary Examiner*—James J. Groody
*Assistant Examiner*—Robert M. Bauer
*Attorney, Agent, or Firm*—Fitzpatrick, Cella, Harper & Scinto

[57] ABSTRACT

An image processing apparatus for printing an image signal consisting of a number of horizontal scanning lines comprises: a sampling circuit for sampling this image signal; an interval changing circuit for changing the sampling interval in the horizontal direction of the sampling circuit; a region changing circuit for narrowing the sampling region of the sampling circuit whenever the sampling interval becomes narrow; and an interpolating circuit for performing the interpolation in the vertical scanning direction in response to the sampling interval becoming narrow. The number of sampling points or the number of horizontal scanning lines which are sampled by the sampling circuit may be changed. In this case, the interpolating circuit performs the interpolation in the vertical direction in response to such a reduction. The image signal may be a television signal consisting of color image signals of R, G and B. With this apparatus, the image signal can be recorded on a recording medium of the same size even in case of enlarging the original image.

11 Claims, 9 Drawing Figures

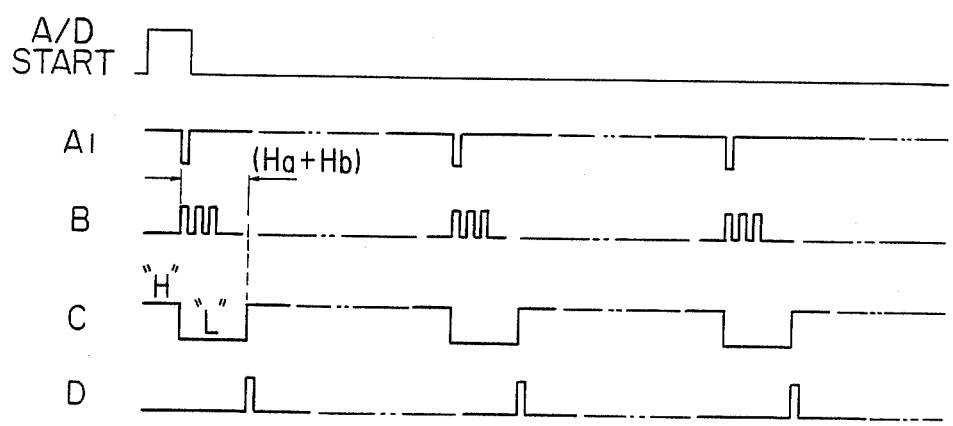
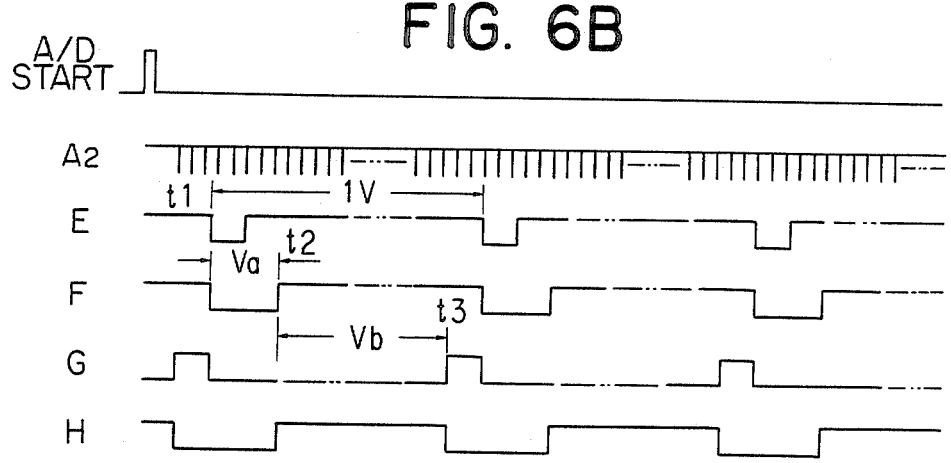

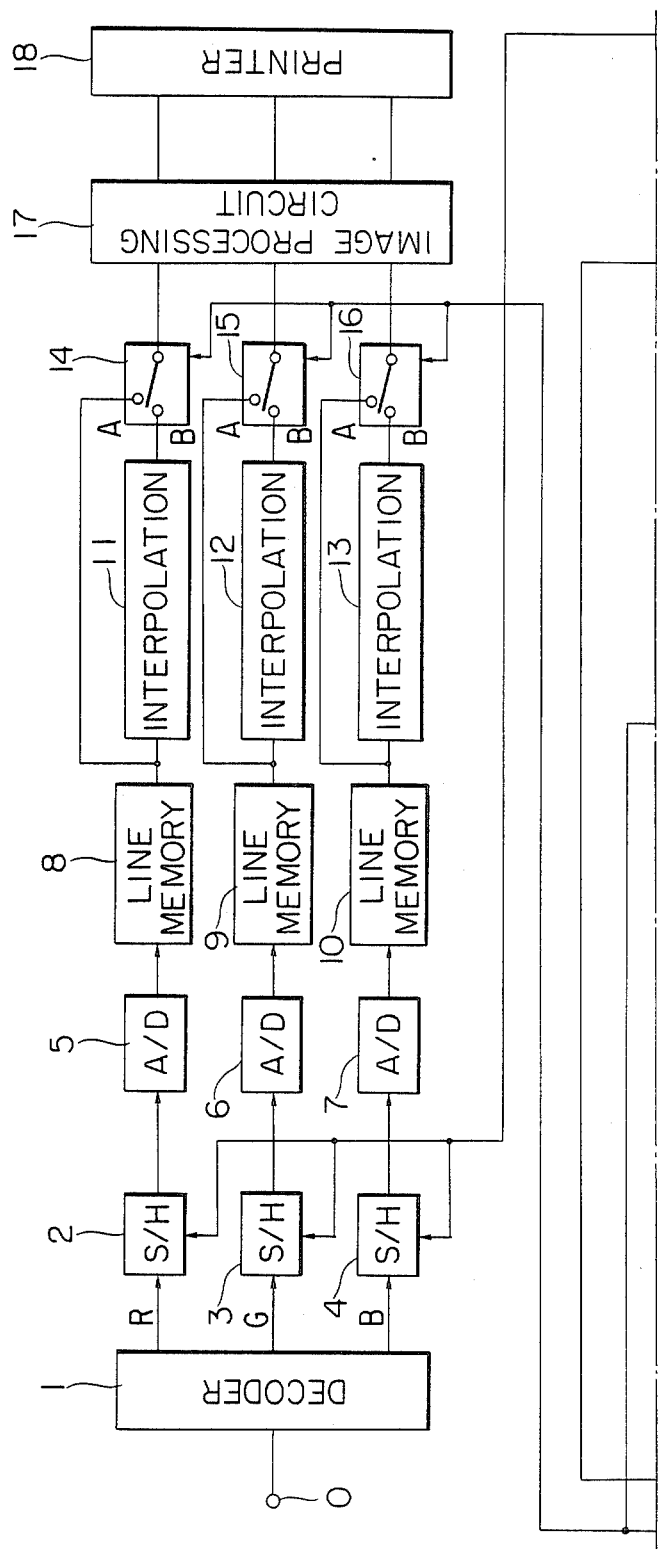

IMAGE PROCESSING APPARATUS HAVING AN AUTOMATIC SAMPLING MODIFICATION FUNCTION

BACKGROUND OF THE INVENTION

1. Field of the Invention

The present invention relates to an image processing apparatus for printing an image signal consisting of a number of horizontal scanning lines.

2. Description of the Prior Art

FIG. 1 shows a diagram for explaining the concept of the sampling of a television video signal in a conventional image processing apparatus of this kind. $l_1$ to $l_n$ denote horizontal scanning lines and n=525 in the case of an NTSC signal. The first sampling point is at the left end of the first effective horizontal scanning interval. $S_1$ to $S_n$ indicate sampling points and the sampling is sequentially performed on a line by line basis for one horizontal period in the vertical scanning direction. After completion of the sampling of one frame, a similar operation is then executed starting at sampling point $S_{n+1}$ shifted in the horizontal direction by only a constant time t.

Now, in the case where the television video information, sampled as described above, is printed by making one sample point correspond to one dot, the signal process may be performed without executing the interpolating operation. However, for instance, as shown in FIG. 2, in the case of forming the print image which is 4/3 times larger than the original image, in order to obtain density information $S_m$ to $S_{m+4}$ as shown in FIG. 2B that is 4/3 times larger than the original information from sample information $S_k$ to $S_{k+3}$ shown in FIG. 2A, the linear interpolations as shown below, for example, are performed.

$S_m = S_k$ $S_{m+1} = (2S_k + S_{k+1})/3$ $S_{m+2} = (S_{k+1} + S_{k+2})/2$ $S_{m+3} = (S_{k+2} + S_{k+3})/3$ $S_{m+4} = S_{k+3}$

By executing the above interpolation, even in the case where the print size was enlarged 4/3 times as shown in FIG. 2C, the interpolated information is derived from the original sample image due to the weighting; therefore, the vertical resolution does not deteriorate.

FIG. 3 is a block diagram of a signal processing system of a conventional video printer provided with an enlarging function to accomplish the foregoing function. A composite television video signal (e.g., NTSC signal) inputted from a terminal O is divided into three primary chrominance signals R, G and B by a decoder 1.

The respective chrominance signals obtained in this way are supplied to sample and hold circuits 2, 3 and 4, by which they are sampled at predetermined times. Thereafter, these sampling signals are digitized by A/D converters 5, 6 and 7. These digital signals are stored in one-line memories 8, 9 and 10 in the vertical direction, respectively. Each of the outputs of those memories is inputted to an input terminal of respective change-over switches 14, 15 and 16 and to respective interpolation circuits 11, 12 and 13. The linear interpolations as described in FIG. 2 are performed in these interpolating circuits. Outputs of the interpolation circuits 11, 12 and 13 are supplied to the other input terminals of the change-over switches 14, 15 and 16. In case of a standard size whereby the sampling point unconditionally corresponds to the print point to satisfy the relation of 1:1, those change-over switches are switched to the side of terminals A in response to an output of a print size setting circuit 19, thereby allowing the data of the line memories 8, 9 and 10 to pass. On the other hand, in the case of the enlargement size that is 4/3 times larger than the original size whereby there is the corespondence relation of 3:4 between the sampling point and the print point, the change-over switches are switched to the side of terminals B, thereby permitting the outputs of the interpolation circuits 11, 12 and 13 to pass, respectively.

Each image sampling data which is outputted from the change-over switches 14, 15 and 16 is supplied to an image processing circuit 17, by which it is subjected to gamma correction, masking process, etc. and is finally inputted as an input signal to a printer 18, so that it is printed.

On the other hand, a sampling signal to control the sample and hold circuits 2, 3 and 4 is formed by a sampling signal forming circuit 23. A preset value setting counter 22 is reset by an A/D start signal and counts fv/2, namely, the number of frames. As shown in FIG. 1 also, in this case, the constant timing from the left end of the effective scanning line to the time when the sampling is performed is set in accordance with this number of frames. The preset value which has been set in this way is loaded into a presettable counter 21 by a horizontal sync signal HD. The counter 21 uses, as a clock input, an output of an oscillator 20 which oscillates at a constant frequency. The counter 21 subtracts the foregoing loaded preset value in response to this clock signal and when the count value becomes 0 (zero), it generates the sampling signal by the borrow BO.

An example of the television signal as the NTSC signal has been described in the above. However, in this case, the number of sampling points in the vertical direction becomes the same as the number of effective vertical intervals, namely, $525 \times 0.91 \approx 480$, while the number of horizontal sampling points becomes $480 \times 4/3 = 640$ in consideration of the aspect ratio of the screen. In the case of enlarging the print size 4/3 times, the number of vertical samples becomes $480 \times 4/3 = 640$ and the number of horizontal samples becomes $630 \times 4/3 = 853$.

Considering a CCIR signal, the number of effective vertical scanning lines becomes $625 \times 0.91 \approx 570$ and the number of horizontal sampling points likewise becomes $570 \times 4/3 = 760$. In this case, when an image is enlarged 4/3 times by use of the interpolating method employed in the foregoing conventional embodiment, the number of vertical sampling points becomes 760 and the number of horizontal sampling points becomes 1012, so that the print size becomes fairly large as compared with the case of the NTSC signal. Therefore, if this apparatus were to be used for both NTSC and CCIR signals, a large blank portion, would result in the case where the NTSC signal is printed, causing a drawback such that the cost becomes comparatively high.

On the other hand, if a print paper size which gives a priority to the NTSC signal is used to avoid such an increase in cost, in the case of the CCIR signal, the enlargement of 4/3 times becomes impossible, even though it is effective in case of the standard size.

In addition, in the case of merely obtaining the image of double size from the NTSC signal as well, the number of sampling points in the horizontal scanning direction becomes 1280, so that if the image is to have the same density, it cannot be fully recorded on the recording paper.

SUMMARY OF THE INVENTION

It is an object of the present invention to provide an image processing apparatus which can eliminate the foregoing drawbacks in the conventional technology.

Another object of the invention is to provide an image processing apparatus in which the sampling region of an image signal is changed in association with the change in the sampling interval.

Still another object of the invention is to provide an image forming apparatus which can record an image on a recording medium of the same size even in the case of enlarging the image.

Other objects and features of the present invention will be apparent from the following detailed description in conjunction with the accompanying drawings.

BRIEF DESCRIPTION OF THE DRAWINGS

FIGS. 6A and 6B are timing charts for each signal, respectively; and

DETAILED DESCRIPTION OF THE PREFERRED EMBODIMENT

Figure 1:
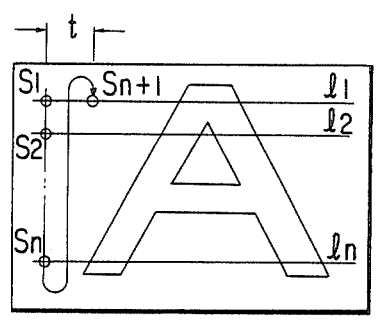
FIG. 1 is a diagram for explaining the concept of the sampling of a television video signal in a conventional video printer.
Figure 2:
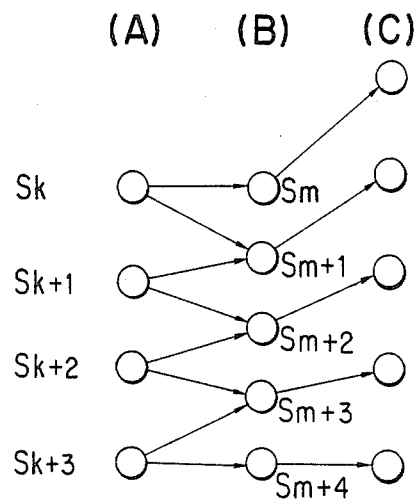
FIG. 2 is an explanatory diagram of an interpolating method for enlargement of 4/3 times.
Figure 4:
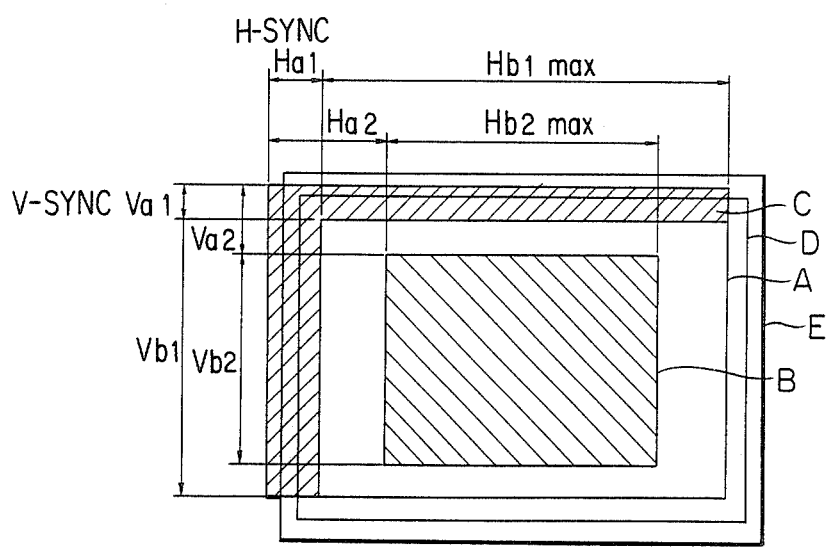
FIG. 4 is an arrangement diagram of one screen of a television signal.

The present invention will now be described hereinbelow with reference to the drawings. FIG. 4 is a diagram showing one screen of a television signal with regard to both horizontal and vertical directions, in which A denotes an effective scanning region which is used for the print of the standard size; a hatched portion C indicates an ineffective scanning region (blanking interval) that does not appear directly on the monitor screen; and D represents a paper size.

A sampling number $Hb1_{max}$ in the horizontal scanning direction in the region A is set to 640. When this sampling number is increased 4/3 times, it becomes 853. Therefore, if this signal is recorded to have the same density as that in the case of the standard size, the image size becomes the size of a region E and becomes larger than the paper size D.

Therefore, to obtain the image of the same size as the ordinary print size due to the environment, the sampling region is set to a region B samller than the effective region A. A sampling number $Hb1_{max}$ in this case almost coincides with a number $Hb2_{max}$; however, other numbers Va2 and Vb2 of sampling scanning lines and an ineffective sampling number Ha2 are different from Va1, Vb1 and Ha1, respectively.

Figure 5:
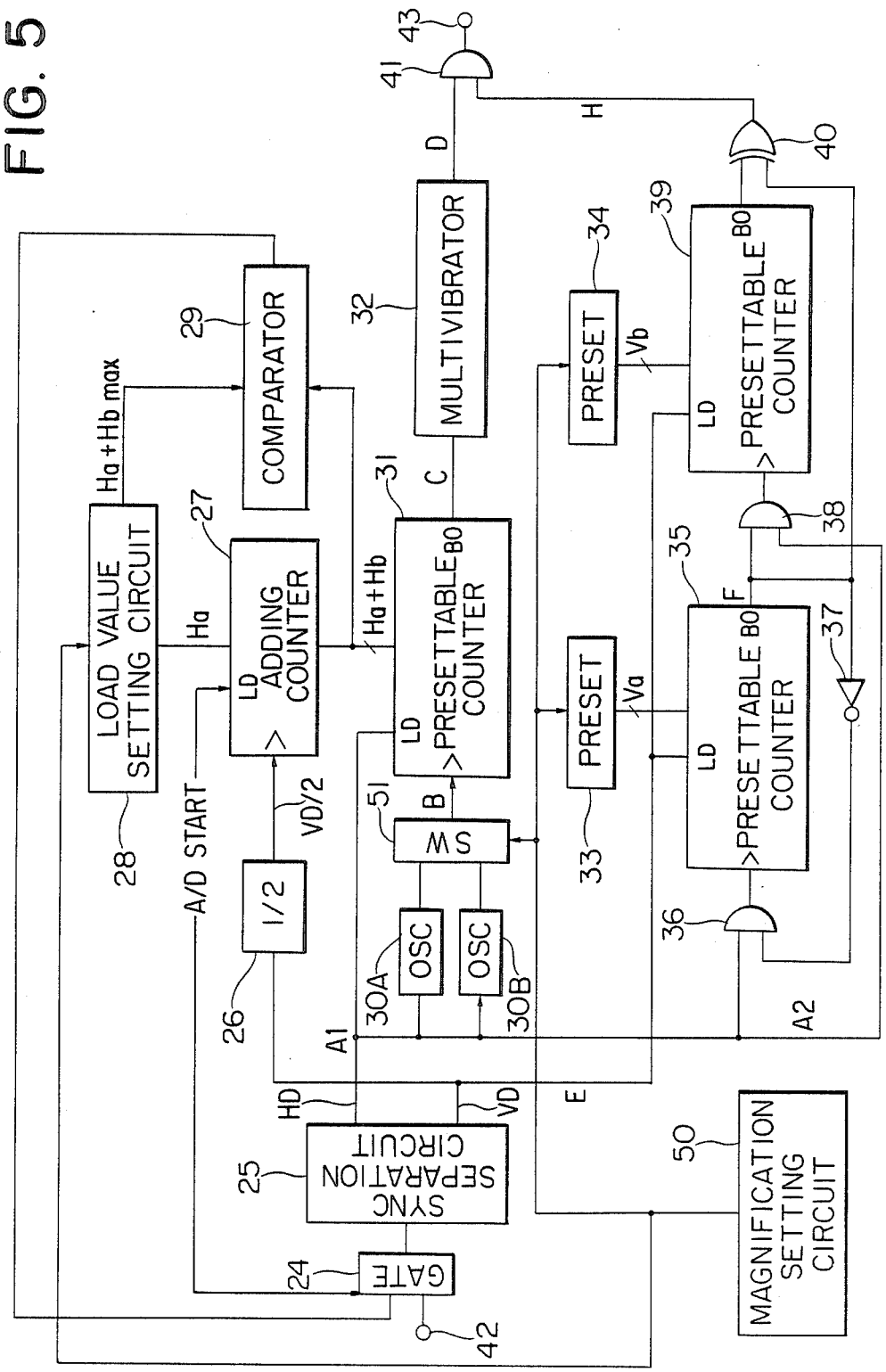
FIG. 5 is a block diagram of one embodiment of an apparatus for performing an enlargement print according to the present invention.

FIG. 5 is a block diagram of an apparatus of one embodiment of the present invention in which a certain portion of the two dimensional scanning region of the television signal is taken out and is subjected to the interpolating operation, thereby performing the enlargement print. FIGS. 6A and 6B are timing charts for each signal. In FIG. 5, magnification information from a magnification setting circuit 50 to designate a magnification in case of enlarging the print of the standard size to an enlargement print is inputted to a load value setting circuit 28, thereby determining the values of Ha and $(Ha + Hb_{max})$ shown in FIG. 4. The value of Ha is loaded into an adding counter 27 by a start signal of this system, namely, by an A/D conversion start signal A/D START (see FIGS. 6A and 6B). A VD/2 signal which is transmitted from a ½ frequency divider 26 is inputted as a clock signal to the counter 27, so that the counter 27 performs the addition by adding the number of frames to the load value Ha. An addition output (Ha+Hb) which is obtained from the counter 27 is loaded into a presettable counter 31 in response to the horizontal sync signal HD which is outputted from a horizontal/vertical sync signal separation circuit 25. The counter 31 takes in an oscillating output from one of clock oscillators 30A and 30B synchronized with the horizontal sync signal HD as a clock input (B in FIG. 6A). Then, the counter 31 subtracts the loaded (Ha+Hb) in response to this clock input. In accordance with the magnification information, the oscillator 30A is selected in case of the standard size and the oscillator 30B is selected in case of the enlargement size by a switch 51. It is apparent that the frequency of the oscillator 30B is higher and its sampling interval t in the horizontal direction is narrower. When the count value becomes 0, a borrow BO becomes high (H) (C in FIG. 6A) and a multivibrator 32 is made operative in response to the leading portion of the borrow BO. Thus, the sampling pulse (D in FIG. 6A) is obtained and this pulse can be derived from an output terminal 43 through an AND gate 41.

On the other hand, a vertical sync signal VD becomes a load signal LD of each of the presettable counters 35 and 39. In response to these load signals LD, Va and Vb are loaded from respective preset value setting circuits 33 and 34, respectively. The values Va and Vb are used to obtain the horizontal scanning line interval in the region to be printed in the vertical direction as shown in FIG. 4. In dependence upon the foregoing magnification information, all scanning lines in the effective scanning region A are selected in case of the standard size and only the scanning lines in the region B are selected in case of the enlargement size. On one hand, the horizontal sync signal HD (A2 in FIG. 6B) is supplied to each input terminal of AND circuit 36 and 38. Outputs of these AND circuits are supplied as the clock inputs to presettable counters 35 and 39, respectively.

When it is now assumed that the vertical sync signal (E in FIG. 6B) is inputted at time $t_1$, only as many horizontal sync signals as the constant number Va are counted from this time point, so that the borrow BO becomes low (L) (F in FIG. 6B). As described above, when the borrow BO becomes "H" at time $t_2$, the horizontal sync signal is inputted to the counter 39 through the AND circuit 38 and, so that the borrow output BO of the counter 39 becomes "L" at time $t_1$. Thereafter, it is "L" during the interval of the horizontal sync signal of (Va+Vb), namely, until time $t_3$ and becomes "H" at time $t_3$, then it is "H" until the next vertical sync signal.

Two borrow outputs (F and G in FIG. 6B) obtained in this way are inputted to an exclusive OR circuit 40 to output a signal (H in FIG. 6B) representative of the horizontal sync signal interval from time $t_2$ to time $t_3$. This gate signal H is inputted to the other input terminal of the AND circuit 41 for gate and only the sampling pulse for the horizontal synchronizing interval of (Va−Vb) can be finally derived.

The system may be constituted in a manner such that the above-described operation is finished when the number of horizontal sampling points becomes (Ha+Hb$_{max}$) after the sampling started from the horizontal sync signal. Therefore, an output (Ha+Hb$_{max}$) from the load value setting circuit 28 and an output (Ha+Hb) from the counter 27 are compared by a comparator 29. When those outputs become the same value, a switching signal is outputted from the comparator 29, thereby blocking the input sync signal to a gate circuit 24. This gate signal is reset by the next A/D conversion start signal. A numerical 42 indicates an input terminal of the sync signal.

In the foregoing embodiment, the sampling region is changed in dependence upon the standard size or enlargement size of a kind of video signal. However, the sampling region can be obviously changed by switching from the NTSC signal to the CCIR signal.

Figure 3:
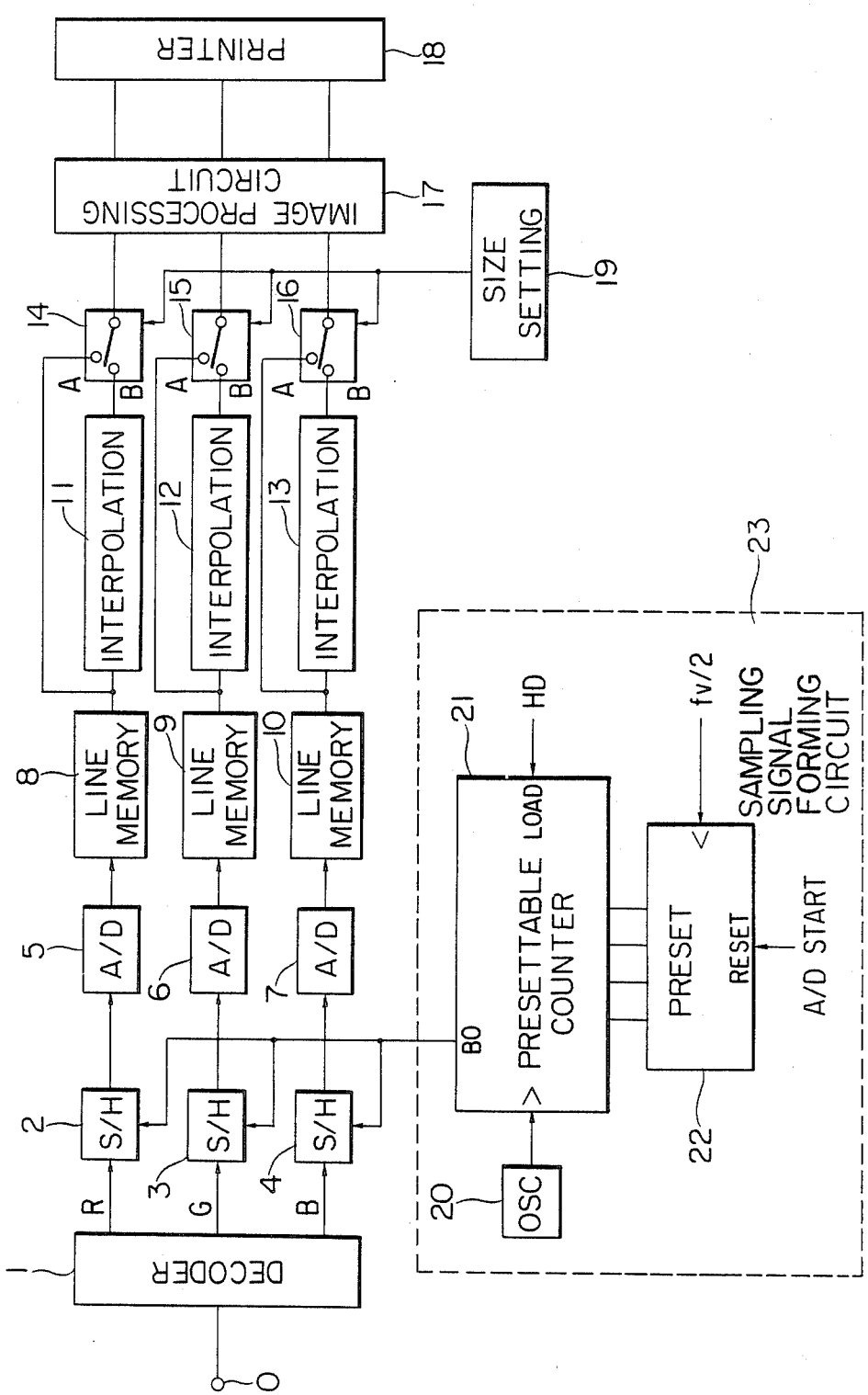
FIG. 3 is a block diagram of a signal processing system of a conventional video printer provided with an enlarging function.
Figure 7B:
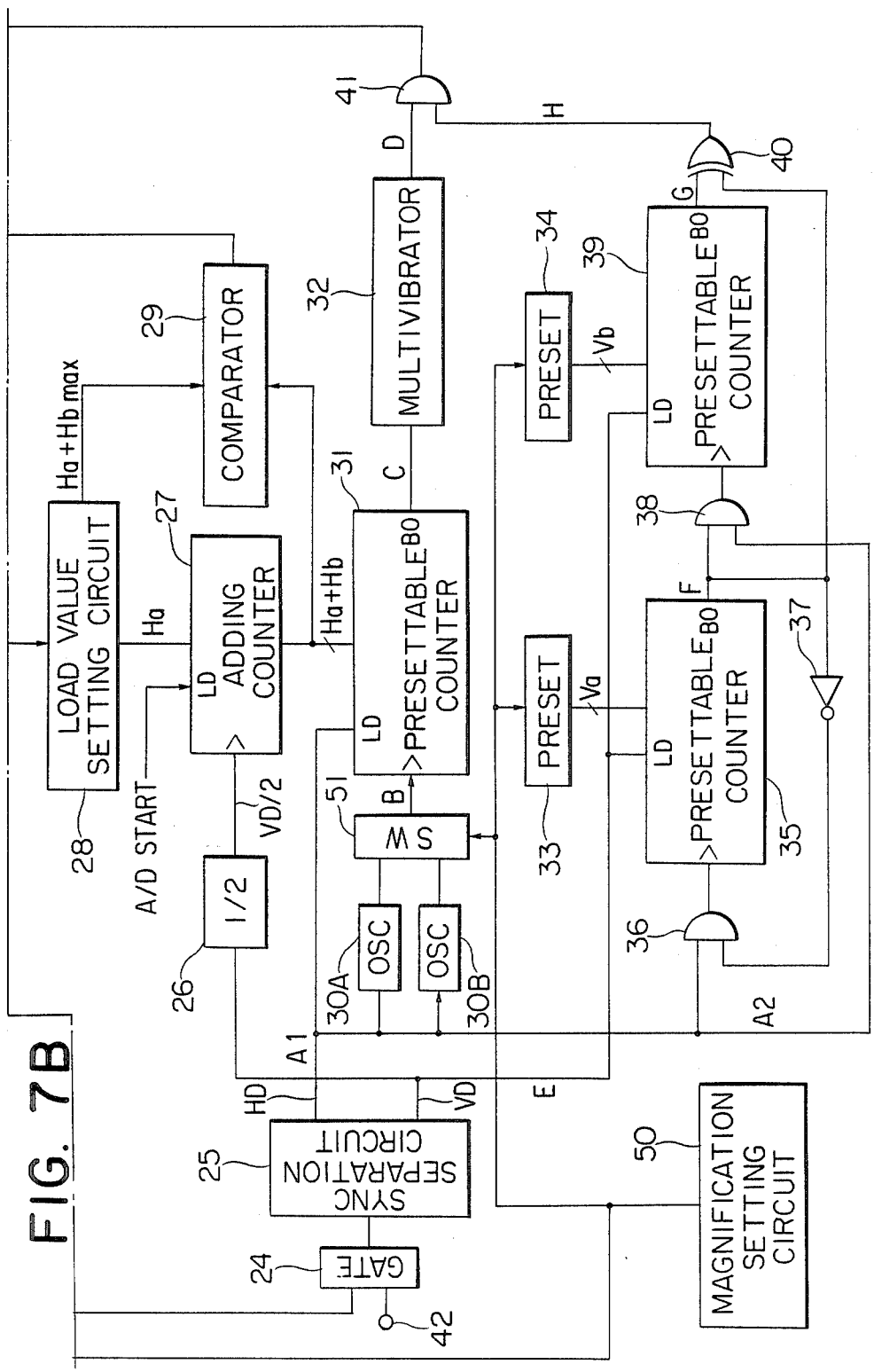
FIG. 7 is a layout diagram of FIGS. 7A and 7B which comprise a block diagram of a signal processing system of a video printer of the embodiment.

The circuit of FIG. 5 described above replaces the sampling pulse forming circuit 23 in FIG. 3. By replacing the circuit 23 by the circuit of FIG. 5, the sampling and print of the television signal can be performed. In this case, the circuit of the overall system becomes as shown in FIGS. 7A and 7B. In FIGS. 7A and 7B, the similar parts and components as those shown in FIGS. 3 and 5 are designated by the same reference numerals. As will be obviously understood from FIGS. 7A and 7B, in the case where the enlargement print is designated by the magnification setting circuit 50, the switches 14, 15 and 16 are switched to the sides of the vertical interpolation circuits 11, 12 and 13, respectively.

In this apparatus, the respective interpolation circuits 11, 12 and 13 are not limited to only the magnification of 4/3 times as explained with regard to the foregoing embodiment. It can be easily understood that various kinds of enlargement magnifications such as twice or the like can be obtained and in such a case, the size of the scanning line region to be extracted may be also varied in accordance with that magnitude. In addition, as a printer, it is possible to use various kinds of printers such as an ink jet printer, electrophotograph printer, thermal printer, thermal transfer copying printer, etc.

As described in the above with regard to the embodiment, even in case of obtaining the print of the enlargement size from the television signal, a partial scanning region of the television signal is extracted; therefore, it is possible to derive an effect such that the partial enlargement print of the video screen of the television can be performed by the same hardwares and the recording paper of the same size, which effect could not be obtained so far.

The present invention is not limited to the foregoing embodiment but many modifications and variations are possible within the spirit and scope of the appended claims of the invention.

What we claim is:

1. An image processing apparatus comprising:
   sampling means for sampling an image signal consisting of a number of horizontal scanning lines;
   interval changing means for changing a sampling interval in the-horizontal scanning direction of said sampling means;
   region changing means for narrowing a sampling region of said sampling means in response to narrowing of the sampling interval; and
   interpolating means for performing interpolation in the vertical scanning direction in response to narrowing of the sampling interval.

2. An image processing apparatus according to claim 1, wherein said region changing means narrows the sampling regions in both horizontal and vertical scanning directions.

3. An image forming apparatus comprising:
   sampling means for sampling an input image signal;
   image forming means for forming an image on a recording medium of a predetermined size in response to sample outputs of said sampling means;
   interval changing means for changing a sampling interval of said sampling means; and
   region changing means for changing a sampling region of said sampling means when the sampling interval is narrowed by said interval changing means,
   wherein said input image signal consists of a plurality of horizontal scanning lines, and said interval changing means changes the sampling interval in the horizontal scanning direction of said sampling means.

4. An image forming apparatus according to claim 3, further comprising interpolating means for performing interpolation in the vertical scanning direction whenever the sampling interval becomes narrow.

5. An image forming apparatus according to claim 3, wherein said region changing means narrows the sampling regions in both horizontal and vertical scanning directions.

6. An image forming apparatus according to claim 3, wherein said input image signal consists of color image signals of at least three colors and said sampling means samples each of said color image signals.

7. An image forming apparatus according to claim 6 wherein said image forming means is a color printer.

8. An image forming apparatus comprising:
   sampling means for sampling an input image signal consisting of a plurality of horizontal lines;
   image forming means for forming an image on a recording medium of a predetermined size in response to sample outputs of said sampling means;
   interval changing means for changing a sampling interval in the horizontal scanning direction of said sampling means; and
   interpolating means for interpolating the sample outputs of said sampling means in accordance with a width of the sampling interval,
   wherein said image forming means forms an image having substantially the same size even if the sampling interval is changed.

9. An image forming apparatus according to claim 8, wherein in the case where the width of the sampling interval is narrowed by said interval changing means, said interpolating means performs interpolation in the vertical scanning direction.

10. An image forming apparatus according to claim 8, wherein said input image signal consists of color image signals of at least three colors and said sampling means samples each of said color image signals.

11. An image forming apparatus according to claim 10, wherein said image forming means is a color printer.

* * * * *

UNITED STATES PATENT AND TRADEMARK OFFICE
CERTIFICATE OF CORRECTION

PATENT NO. : 4,734,785
DATED : March 29, 1988
INVENTOR(S) : MASAHIRO TAKEI, ET AL.

It is certified that error appears in the above-identified patent and that said Letters Patent is hereby corrected as shown below:

COLUMN 2

Line 63, "portion," should read --portion--.

COLUMN 3

Line 65, "environment," should read --enlargement,--.
Line 66, "samller" should read --smaller--.

COLUMN 4

Line 57, "circuit" should read --circuits--.

COLUMN 5

Line 23, "numerical 42" should read --numeral 42--.

COLUMN 6

Line 41, "claim 6" should read --claim 6,--.

Signed and Sealed this

Fourteenth Day of March, 1989

Attest:

DONALD J. QUIGG

Attesting Officer

Commissioner of Patents and Trademarks